United States Patent
Shibata (10) Patent No.: US 10,218,214 B2
(45) Date of Patent: Feb. 26, 2019

(54) ENERGY MANAGEMENT SYSTEM WITH DETECTION VOLTAGE CALIBRATION

(71) Applicant: Murata Manufacturing Co., Ltd., Nagaokakyo-shi, Kyoto-fu (JP)

(72) Inventor: Kohei Shibata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/838,719

(22) Filed: Dec. 12, 2017

(65) Prior Publication Data

US 2018/0115186 A1 Apr. 26, 2018

Related U.S. Application Data

(63) Continuation of application No. PCT/JP2016/067161, filed on Jun. 9, 2016.

(30) Foreign Application Priority Data

Jun. 24, 2015 (JP) .................................. 2015-126178

(51) Int. Cl.
*H02J 1/10* (2006.01)
*H02J 1/12* (2006.01)
(Continued)

(52) U.S. Cl.
CPC ................. *H02J 7/35* (2013.01); *H02J 1/102* (2013.01); *H02J 1/12* (2013.01); *H02J 3/38* (2013.01);
(Continued)

(58) Field of Classification Search
CPC ........ H02J 7/35; H02J 3/32; H02J 3/38; H02J 1/12; H02M 7/44; H02M 7/48; H02M 3/00; H02M 3/02
See application file for complete search history.

(56) References Cited

U.S. PATENT DOCUMENTS 6,563,720 B2 5/2003 Kitano
8,368,373 B2 2/2013 Ozawa et al.
(Continued)

FOREIGN PATENT DOCUMENTS

JP 2002-300779 A 10/2002
JP 2005-224009 A 8/2005
(Continued)

OTHER PUBLICATIONS

International Search Report issued in International Application No. PCT/JP2016/067161, dated Aug. 23, 2016.
(Continued)

*Primary Examiner* — David V Henze-Gongola
(74) *Attorney, Agent, or Firm* — Arent Fox LLP (57) ABSTRACT

An energy management system that includes a power generation apparatus that outputs generated electric power to a HVDC bus, a bidirectional DC-DC converter to which a DC voltage is input from the HVDC bus or outputting a DC voltage to the HVDC bus, and an inverter that converts a DC voltage inputted from the HVDC bus to an AC voltage. A calibration value is set to the highest voltage among voltages of the HVDC bus each detected by the power generation apparatus, the bidirectional DC-DC converter, and the inverter, other detection voltages are calibrated with the calibration value. Then, each of the power generation apparatus, the bidirectional DC-DC converter, and the inverter carry out switching control such that the detection voltage after the calibration match with a target value.

20 Claims, 6 Drawing Sheets

(51) Int. Cl.
*H02J 3/32* (2006.01)
*H02J 3/38* (2006.01)
*H02J 7/35* (2006.01)
*H02M 3/00* (2006.01)
*H02M 3/02* (2006.01)
*H02M 7/44* (2006.01)
*H02M 7/48* (2007.01)

(52) U.S. Cl.
CPC .............. *H02J 3/381* (2013.01); *H02J 3/383* (2013.01); *H02M 3/00* (2013.01); *H02M 3/02* (2013.01); *H02M 7/44* (2013.01); *H02M 7/48* (2013.01); *H02J 3/32* (2013.01); *Y02P 90/50* (2015.11)

(56) References Cited

U.S. PATENT DOCUMENTS

| | | |
|---|---|---|
| 9,653,922 B2 | 5/2017 | Baba |
| 2002/0141205 A1 | 10/2002 | Kitano |
| 2007/0242557 A1 | 10/2007 | Ozawa et al. |
| 2008/0054847 A1* | 3/2008 | Elias ................. G01R 31/3627 320/130 |
| 2014/0333140 A1* | 11/2014 | Baba ........................ H02J 3/12 307/82 |

FOREIGN PATENT DOCUMENTS

| | | |
|---|---|---|
| JP | 2007-259659 A | 10/2007 |
| JP | 2013-106451 A | 5/2013 |
| JP | 2014-99986 A | 5/2014 |
| JP | 2015-192529 A | 11/2015 |

OTHER PUBLICATIONS

Written Opinion of the International Searching Authority issued in International Application No. PCT/JP2016/067161, dated Aug. 23, 2016.

\* cited by examiner

|  | case1 | case2 | case3 |
|---|---|---|---|
| PV CONVERTER | 378 | 372 | 387 |
| DC-DC CONVERTER | 380 | 380 | 380 |
| INVERTER | 385 | 380 | 373 |

ENERGY MANAGEMENT SYSTEM WITH DETECTION VOLTAGE CALIBRATION

CROSS REFERENCE TO RELATED APPLICATIONS

The present application is a continuation of PCT/JP2016/067161 filed Jun. 9, 2016, which claims priority to Japanese Patent Application No. 2015-126178, filed Jun. 24, 2015, the entire contents of each of which are incorporated herein by reference.

TECHNICAL FIELD

The present disclosure relates to an energy management system that uses electric power generated in houses, factories, or the like.

BACKGROUND

A power generator such as, for example, a solar power generation system in which electric power generated by a solar panel is used in a house or the like includes a DC voltage bus (hereinafter an "HVDC bus"). A photovoltaic (hereinafter "PV") converter, an inverter, a bidirectional DC-DC converter, and the like are connected to the HVDC bus. The PV converter outputs electric power generated by a solar power generation apparatus to the HVDC bus with a predetermined voltage. The bidirectional DC-DC converter to which a secondary battery is connected converts a DC voltage transferred/received between the secondary battery and the HVDC bus to a predetermined constant voltage. Furthermore, the inverter transmits the electric power generated by the power generator or the electric power stored in the secondary battery to an electric power system, and supplies electric power from the electric power system to the HVDC bus.

Patent Document 1 (identified below), for example, discloses a power supply system, in which a plurality of power supply units are connected to a DC voltage bus that is capable of performing cooperative control. The power supply system disclosed in Patent Document 1, in which a plurality of power supply units such as a solar power generation unit or the like are connected to the DC voltage bus, autonomously determines a transfer/reception amount of electric power transferred/received with the DC voltage bus on the basis of a voltage of the DC voltage bus. It is noted that the above-described solar power generation system generally includes a detection circuit for detecting the voltage of the HVDC bus in order to maintain the voltage of the HVDC bus at a predetermined value and controls the voltage by switching control or the like such that the detection result becomes the predetermined voltage.

Patent Document 1: Japanese Unexamined Patent Application Publication No. 2005-224009.

In general, it is expected that the solar power generation system or the like will be used for a long period. However, an error (deviation) may occur in the detection result of the voltage by the detection circuit described above during the long-term use. For example, in Patent Document 1, the detection voltage of each of the power supply units varies with respect to a true value of the voltage of the HVDC bus. As a result, there is a risk that the voltage of the DC voltage bus does not stabilize.

In other words, because the values of the detection voltages detected by the respective power supply units are different, it is difficult to stably control the HVDC bus voltage. Accordingly, countermeasures against the error in the detection circuit caused by the long-term use are needed. Additionally, when a higher voltage than a desired voltage value (for example 380 V) is continuously applied to each component such as a PV converter or the like connected to the HVDC bus, there is a problem that a lifespan thereof shortens. Accordingly, the voltage of the DC voltage bus is desirably set so as to be maintained at a lower voltage value while being close to the desired voltage value as much as possible.

SUMMARY OF THE INVENTION

Thus, it is an object of the present disclosure to provide an energy management system capable of taking a countermeasure for stabilizing a voltage of a DC voltage bus and capable of prolonging a lifespan of a component, even in a case where a voltage detection result deviates at a plurality of voltage detection portions with a lapse of time.

Accordingly, an energy management system is disclosed that includes a DC voltage bus; a power generation apparatus connected to the DC voltage bus and that outputs generated electric power to the DC voltage bus; a bidirectional DC-DC converter connected to the DC voltage bus and to which a DC voltage is inputted from the DC voltage bus or outputting a DC voltage to the DC voltage bus; and an inverter connected to the DC voltage bus that converts a DC voltage inputted from the DC voltage bus to an AC voltage. Moreover, each of the power generation apparatus, the bidirectional DC-DC converter, and the inverter has a voltage detection portion detecting a voltage of the DC voltage bus, and a switching control unit carrying out switching control such that the voltage that the voltage detection portion detects matches with a target value. Furthermore, the energy management system includes a calibration value setting unit that compares the voltages detected by the respective voltage detection portions and sets a calibration value to the highest voltage, and a calibration unit that calibrates the detection voltages of the voltage detection portions excluding the voltage detection portion which detects the highest voltage with the calibration value.

The voltage detection results by the power generation apparatus, the bidirectional DC-DC converter, and the inverter do not match with one another due to errors occurring with the lapse of time. Accordingly, in this configuration, each different detection result is calibrated so as to be the highest voltage among the detection results. Additionally, each of the power generation apparatus, the bidirectional DC-DC converter, and the inverter carries out switching control using the voltage value after the calibration. This makes it possible to stabilize the voltage of the DC voltage bus, even if the voltage detection results by the plurality of voltage detection portions deviate with the lapse of time.

Additionally, setting the calibration value to the highest voltage value among the detection voltages and controlling the voltage of the DC voltage bus with the value after the calibration makes it possible to lower the voltage applied to each component of each of the power generation apparatus, the bidirectional DC-DC converter, and the inverter. As a result, the lifespans of the components can be prolonged.

The energy management system according to the present disclosure includes a controller area network, in which the power generation apparatus, the bidirectional DC-DC converter, and the inverter may be connected to the controller area network.

According to this configuration, intercommunication can be performed with serial bus communication which does not need master-slave setting and is resistant to noise.

The energy management system according to the present disclosure can further include a setting unit that sets a timing when voltage fluctuations of the DC voltage bus are minimized during a predetermined period, in which the calibration unit calibrates at the timing set by the setting unit.

According to this configuration, accurate calibrations can be performed by calibrating the voltage when the voltage of the DC voltage bus experiences little fluctuations.

The energy management system according to the present disclosure may include a temperature detection unit that detects an ambient temperature, and a correction unit that corrects the detection voltage by the voltage detection portion in accordance with the temperature detected by the temperature detection unit.

According to this configuration, the error in the detection result of the voltage, which is caused by a difference in the temperature by a season, a time zone, or the like, can be further suppressed.

The power generation apparatus, the bidirectional DC-DC converter, and the inverter may be configured to each have the temperature detection unit.

According to this configuration, it is possible to further accurately detect the temperature, and as a result, the error in the detection result of the voltage caused by the difference in the temperature can be further suppressed.

According to the present disclosure, an energy management system can be provided that is capable of taking a countermeasure for stabilizing a voltage of a DC voltage bus at a predetermined value, and is capable of prolonging a lifespan of a component, even in a case where a voltage detection result deviates with a lapse of time.

DETAILED DESCRIPTION OF EXEMPLARY EMBODIMENTS

Figure 1:
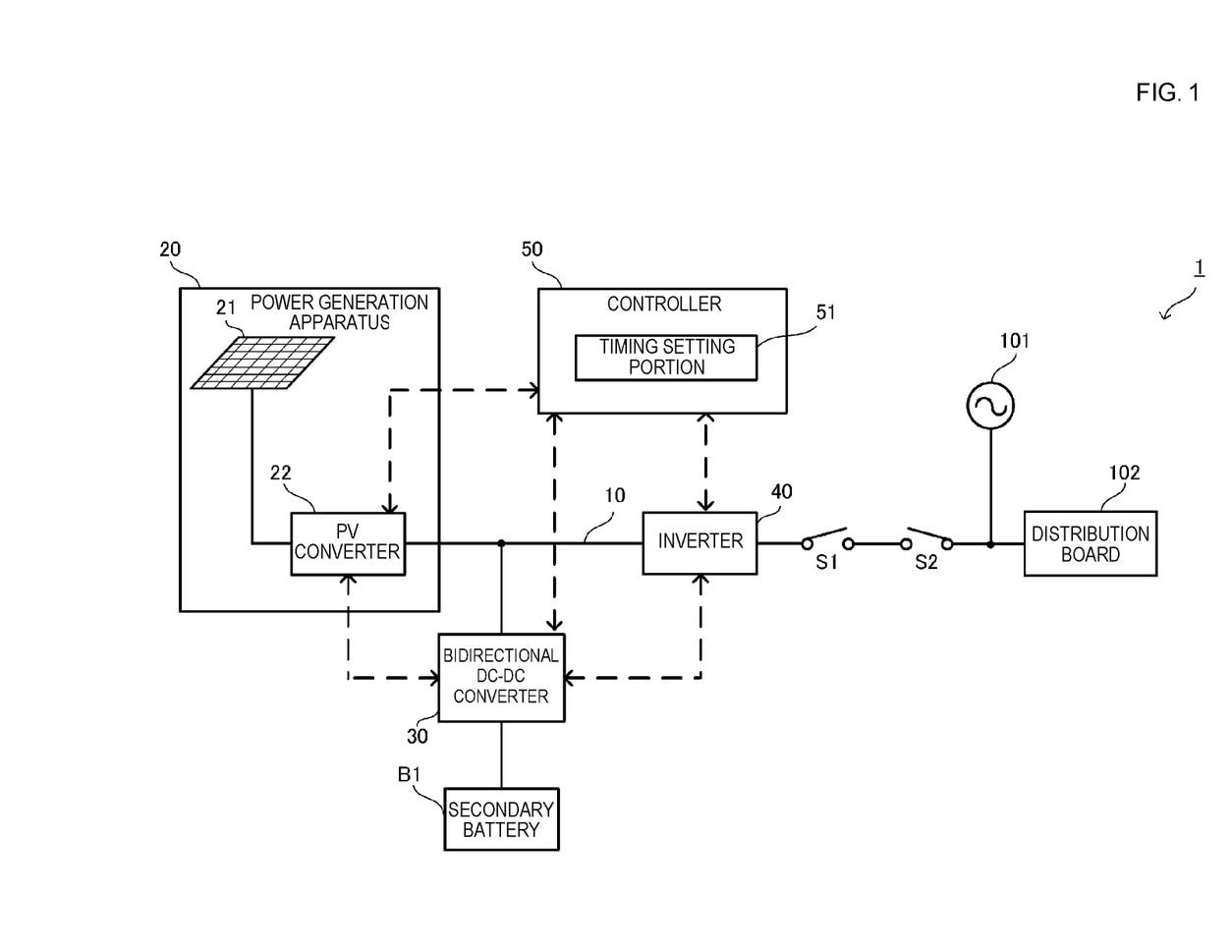
FIG. 1 is a diagram illustrating an energy management system according to an exemplary embodiment.

FIG. 1 is a diagram illustrating an energy management system 1 according to an exemplary embodiment.

The energy management system 1 includes a power generation apparatus 20 (i.e., a "power generator"), a bidirectional DC-DC converter 30, an inverter 40, and a controller 50. The power generation apparatus 20, the bidirectional DC-DC converter 30, and the inverter 40 are connected to an HVDC bus 10. The HVDC bus 10 is an example of a "DC voltage bus" according to the present disclosure. It is noted that each controller described herein can comprises a computer processor, a microprocessor, a microcontroller, or the like that includes memory with software stored thereon that, when executed by the processing unit, is configured to each the respective algorithms as described herein.

Additionally, the power generation apparatus 20, the bidirectional DC-DC converter 30, and the inverter 40 are connected so as to be able to perform data communication with one another through a controller area network (CAN). By connecting the apparatuses through the CAN, intercommunication can be performed between the apparatuses with serial bus communication without requiring master-slave setting while being resistant to noise.

The power generation apparatus 20 includes an optical power generation panel 21 and a PV converter 22. The PV converter 22 outputs electric power generated by the optical power generation panel 21 to the HVDC bus 10. it is noted that the power generation apparatus 20 may be a wind power generation apparatus, a gas power generation apparatus, or the like.

The power generation apparatus 20 detects an output voltage and an output current. Furthermore, based on the detected output voltage and output current, maximum power point tracking (MPPT) control for maximizing output electric power is performed. A power generation amount by the optical power generation panel 21 fluctuates depending on an environment (an installation place, weather, or the like). Accordingly, the power generation apparatus 20 outputs the maximum electric power according to the environment at the time by performing MPPT control.

A secondary battery B1 is connected to the bidirectional DC-DC converter 30. The bidirectional DC-DC converter 30 converts (steps up or steps down) the DC voltage outputted from the PV converter 22 to the HVDC bus 10, and charges the secondary battery B1. Additionally, the bidirectional DC-DC converter 30 converts the DC voltage with which the secondary battery B1 is charged, and outputs the resulting voltage to the HVDC bus 10.

The inverter 40 is connected to an electric power system 101 and a distribution board 102 with the switches S1 and S2 interposed therebetween. An AC output terminal (AC outlet or the like), which is not illustrated, is connected to the distribution board 102. A load such as a microwave oven, a washing machine, an air conditioner, or the like is connected to the AC output terminal. The inverter 40 converts the DC voltage inputted from the HVDC bus 10 to an AC voltage, and outputs the resulting voltage to the electric power system 101 side. Additionally, the inverter 40 converts an AC voltage inputted from the electric power system 101 side to a DC voltage, and outputs the resulting voltage to the HVDC bus 10.

The switches S1 and S2 are turned on at a normal state in which there is no abnormality in the electric power system 101 (for example, a power outage). Additionally, the switches S1 and S2 are turned off in a case where the electric power system 101 is abnormal. Turning the switches S1 and S2 off makes it possible to prevent the voltage outputted from the inverter 40 from flowing into the electric power system 101.

The controller 50 (e.g., a computer processing unit) controls the energy management system 1 as a whole. For example, the controller 50 performs on/off control of the switches S1 and S2 in accordance with presence or absence of the abnormality in the electric power system 101.

The controller 50 has a timing setting portion 51. The timing setting portion 51 is an example of a "setting unit" according to the present disclosure. The timing setting portion 51 sets a timing when detection bus voltage calibration control is executed as will be described below. It is noted that in general each "portion" or component described herein includes appropriate electronic circuitry in order to perform the stated function of the component.

The detection bus voltage calibration control is preferably performed when the voltage of the HVDC bus 10 stabilizes (when there is little voltage fluctuation). Accordingly, the timing setting portion 51 sets the timing under a condition such as a state where the voltage fluctuations of the HVDC bus 10 are within ±10 V, a state where there is almost no electric power transfer/reception in the PV converter 22 or the like, a standby state immediately after the end of solar power generation during daytime or immediately after the end of discharge of the secondary battery during nighttime, or the like, for example. Particularly, in a predetermined period (for example, one day, one week, one month, one year, or the like), a timing when the voltage fluctuations of the HVDC bus 10 are minimized is desirably set. It is noted that the timing may be set in advance in an exemplary aspect.

Hereinafter, the configuration of each of the power generation apparatus 20, the bidirectional DC-DC converter 30, and the inverter 40 will be described in detail.

Figure 2:
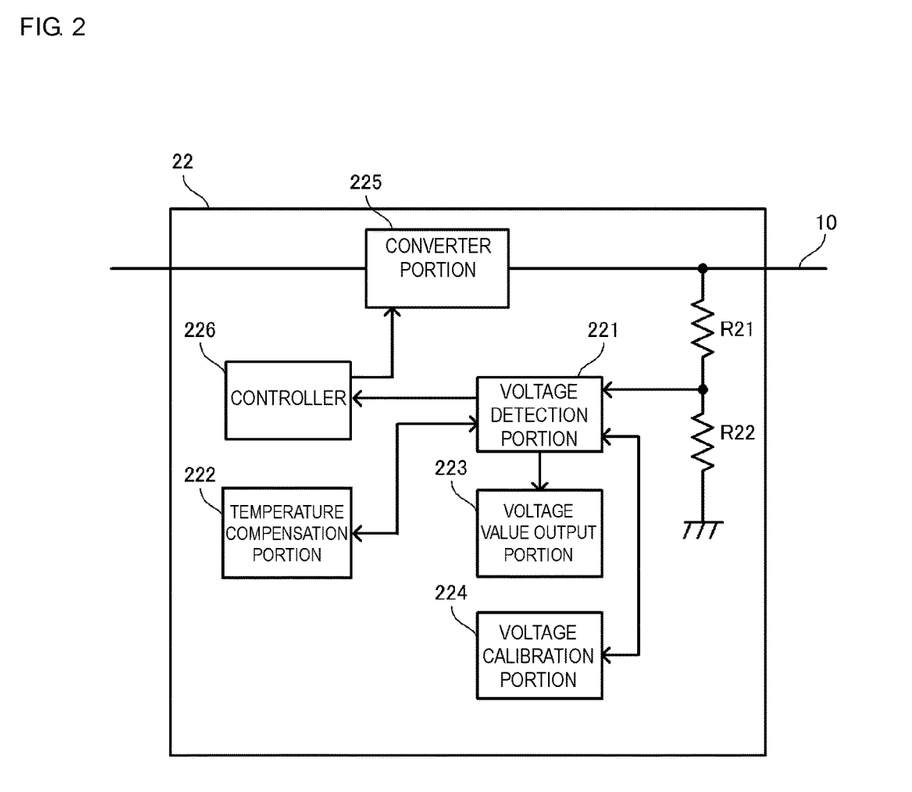
FIG. 2 is a diagram illustrating the configuration of a PV converter included in a power generation apparatus.

FIG. 2 is a diagram illustrating the configuration of the PV converter 22 included in the power generation apparatus 20.

The PV converter 22 has a voltage detection portion 221, a temperature compensation portion 222, a voltage value output portion 223, a voltage calibration portion 224, a converter portion 225, and a controller 226.

The voltage detection portion 221 can include a voltage detector that is configured to detect an output voltage of the PV converter 22, that is, the voltage of the HVDC bus 10. In an exemplary aspect, the PV converter 22 has voltage dividing resistances R21 and R22 connected to the HVDC bus 10. The voltage detection portion 221 detects the voltage of the HVDC bus 10 with these voltage dividing resistances R21 and R22.

The temperature compensation portion 222 can include a temperature sensor that detects temperature of the PV converter 22 (inside and periphery), and can be configured to correct the voltage that the voltage detection portion 221 detects in accordance with the detected temperature. The temperature compensation portion 222 is an example of a "temperature detection unit" and a "correction unit" according to the present disclosure. Temperature in the energy management system 1 changes depending on a time zone or a season. Because of this temperature change, resistance values of the voltage dividing resistances R21 and R22 change. Accordingly, a voltage detection result by the voltage detection portion 221 includes an error caused by the temperature. Therefore, the temperature compensation portion 222 corrects the voltage that the voltage detection portion 221 detects on the basis of temperature characteristics. This makes it possible to further suppress the error in the detection result of the voltage by the voltage detection portion 221.

It is noted that the temperature characteristics are calculated, for example, using a change in a temperature rise value and a sensitivity correction value obtained by performing sensitivity calibration of the energy management system 1 between with no load and during rated driving operation in the manufacturing period. Additionally, it is unlikely that the temperature characteristics largely change with the lapse of time, the temperature characteristics set once is desirably fixed.

The voltage value output portion 223 outputs the voltage value detected by the voltage detection portion 221 to the bidirectional DC-DC converter 30 (e.g., by the connections shown as dashed arrows in FIG. 1). At this time, when the voltage value has been corrected by the temperature compensation portion 222, the voltage value output portion 223 outputs the voltage value after the correction. It is noted that, as described above, since the power generation apparatus 20 and the bidirectional DC-DC converter 30 are connected through the CAN (i.e., the bi-directional dashed arrows), the voltage value outputted from the PV converter 22 to the bidirectional DC-DC converter 30 can be outputted without being affected by noise.

The voltage calibration portion 224 calibrates the voltage detected by the voltage detection portion 221. The voltage calibration portion 224 is an example of a "calibration unit" or "calibrator" according to the present disclosure. As will be described later in detail, the bidirectional DC-DC converter 30 sets a calibration value of the voltage. The voltage calibration portion 224 acquires the calibration value from the bidirectional DC-DC converter 30. Then, the voltage calibration portion 224 calibrates the voltage detected by the voltage detection portion 221 to the calibration value. For example, when the voltage detected by the voltage detection portion 221 is 378 V and the calibration value set by the bidirectional DC-DC converter 30 is 380 V, the voltage calibration portion 224 calibrates the voltage detected by the voltage detection portion 221 to 380 V (e.g., by increasing the detection voltage by 2 volts from 378 V to 380 V).

The controller 226 carries out switching control on the converter portion 225. The controller 226 is an example of a "switching control unit" according to the present disclosure. The voltage detected by the voltage detection portion 221 is fed back to the controller 226. Then, the controller 226 carries out switching control on the converter portion 225 such that the voltage that the voltage detection portion 221 detects approaches a target value. At this time, the voltage fed back to the controller 226 is the voltage which has been corrected by the temperature compensation portion 222 and calibrated by the voltage calibration portion 224.

Figure 3:
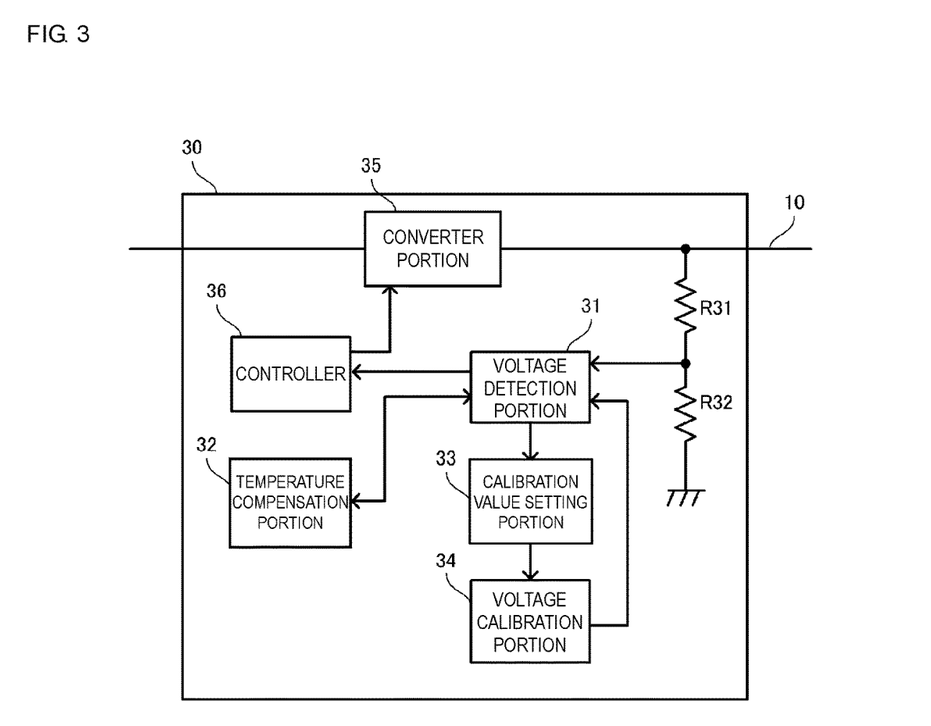
FIG. 3 is a diagram illustrating the configuration of a bidirectional DC-DC converter.

FIG. 3 is a diagram illustrating the configuration of the bidirectional DC-DC converter 30.

The bidirectional DC-DC converter 30 has a voltage detection portion 31, a temperature compensation portion 32, a calibration value setting portion 33, a voltage calibration portion 34, a converter portion 35, and a controller 36.

The voltage detection portion 31 can include a voltage detector that is configured to detect an output voltage to the HVDC bus 10 side of the bidirectional DC-DC converter 30, that is, the voltage of the HVDC bus 10. The bidirectional DC-DC converter 30 has voltage dividing resistances R31 and R32 connected to the HVDC bus 10. The voltage detection portion 31 detects the voltage of the HVDC bus 10 with these voltage dividing resistances R31 and R32.

The temperature compensation portion 32 can include a temperature sensor configured to detect temperature of the bidirectional DC-DC converter 30, and can correct the voltage that the voltage detection portion 31 detects in accordance with the detected temperature, in the same manner as the temperature compensation portion 222 of the PV converter 22. The temperature compensation portion 32 is an example of a "temperature detection unit" and a "correction unit" according to the present disclosure.

The calibration value setting portion 33 (e.g., a calibration value selector) can include a comparator (or similar circuitry) that is configured to compare the voltages detected by the power generation apparatus 20 and the inverter 40 and the voltage detected by the voltage detection portion 31, and to set a calibration value to the highest voltage value. The calibration value setting portion 33 outputs the set calibration value to the power generation apparatus 20 and the inverter 40.

In other words, the calibration value setting portion 33 sets the calibration value to the highest voltage value among voltages each detected by the power generation apparatus 20, the inverter 40, and the bidirectional DC-DC converter 30. Then, such that the voltages each detected by the voltage detection portion 221 and a voltage detection portion 41 can be calibrated to the calibration value described above, the calibration value is transmitted to the power generation apparatus 20 and the inverter 40. The calibration value setting portion 33 is an example of a "calibration value setting unit" according to the present disclosure.

The voltage calibration portion 34 calibrates the voltage detected by the voltage detection portion 31 to the calibration value set by the calibration value setting portion 33. The voltage calibration portion 34 is an example of a "calibration unit" or "calibrator" according to the present disclosure.

The controller 36 carries out switching control on the converter portion 35. The controller 36 is an example of a "switching control unit" according to the present disclosure. The voltage detected by the voltage detection portion 31 is fed back to the controller 36. Then, the controller 36 carries out switching control on the converter portion 35 such that the voltage that the voltage detection portion 31 detects approaches the target value. At this time, the voltage fed back to the controller 36 is the voltage which has been corrected by the temperature compensation portion 32 and calibrated by the voltage calibration portion 34.

Figure 4:
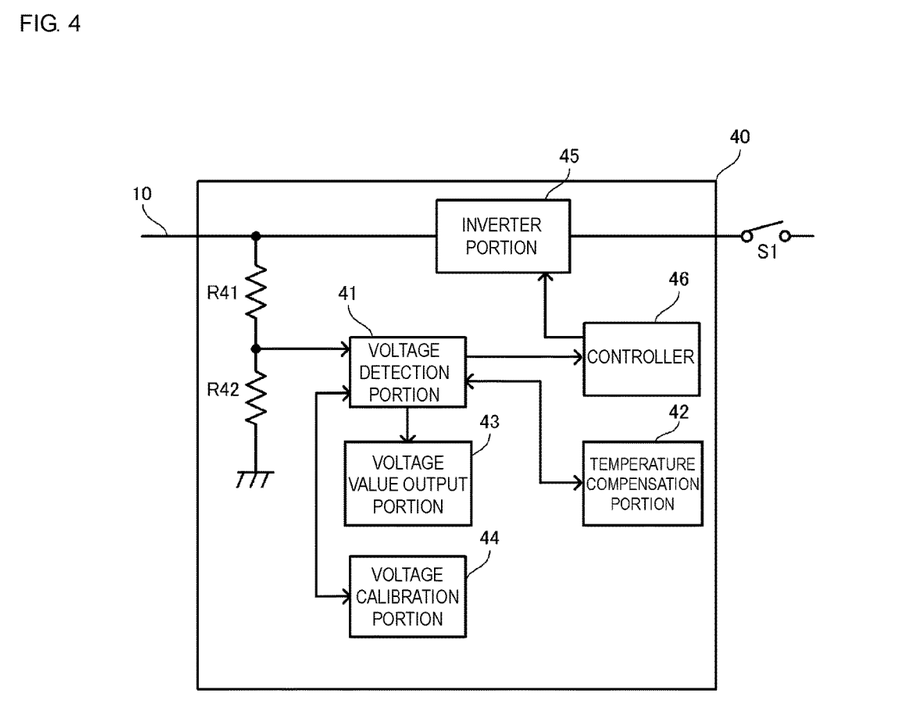
FIG. 4 is a diagram illustrating the configuration of an inverter.

FIG. 4 is a diagram illustrating the configuration of the inverter 40.

The inverter 40 has the voltage detection portion 41, a temperature compensation portion 42, a voltage value output portion 43, a voltage calibration portion 44, an inverter portion 45, and a controller 46.

The voltage detection portion 41 includes a voltage detector that is configured to detect an output voltage of the inverter 40, that is, the voltage of the HVDC bus 10. The inverter 40 has voltage dividing resistances R41 and R42 connected to the HVDC bus 10. The voltage detection portion 41 detects the voltage of the HVDC bus 10 with these voltage dividing resistances R41 and R42.

The temperature compensation portion 42 can include a temperature sensor configured to detect the temperature of the inverter 40 (inside and periphery), and is configure to correct the voltage that the voltage detection portion 41 detects in accordance with the detected temperature, in the same manner as the temperature compensation portion 222 of the PV converter 22 as described above. The temperature compensation portion 42 is an example of a "temperature detection unit" and a "correction unit" according to the present disclosure.

The voltage value output portion 43 outputs the voltage value detected by the voltage detection portion 41 to the bidirectional DC-DC converter 30. At this time, when the voltage value has been corrected with respect to the temperature by the temperature compensation portion 42, the voltage value output portion 43 outputs the voltage value after the correction.

The voltage calibration portion 44 calibrates the voltage detected by the voltage detection portion 41 to the calibration value set by the calibration value setting portion 33 of the bidirectional DC-DC converter 30.

The controller 46 carries out switching control on the inverter portion 45. The controller 46 is an example of a "switching control unit" according to the present disclosure. The voltage detected by the voltage detection portion 41 is fed back to the controller 46. Then, the controller 46 carries out switching control on the inverter portion 45 such that the voltage that the voltage detection portion 41 detects approaches the target value. At this time, the voltage fed back to the controller 46 is the voltage which has been corrected by the temperature compensation portion 42 and calibrated by the voltage calibration portion 44.

Next, the detection bus voltage calibration control executed by the energy management system 1 configured as described above will be described.

Figure 5:
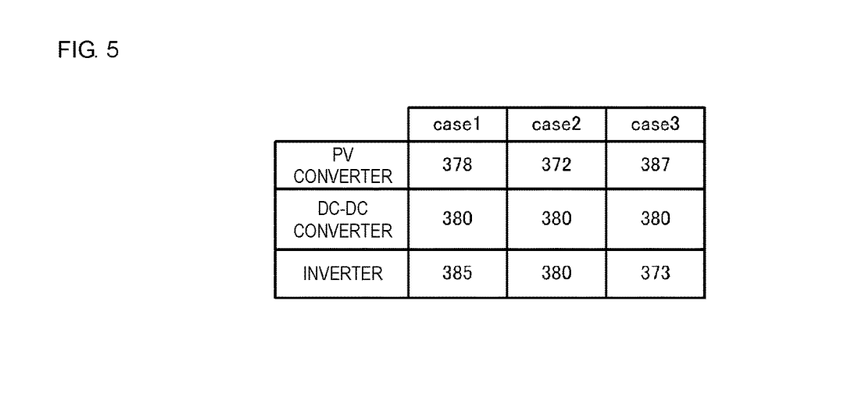
FIG. 5 is a diagram for explaining detection bus voltage calibration control.

FIG. 5 is a diagram for explaining the detection bus voltage calibration control.

Normally, the voltages of the HVDC bus 10 each detected by the PV converter 22, the bidirectional DC-DC converter 30, and the inverter 40 ideally match with one another. However, detection accuracy of the energy management system 1 drops due to long-term use thereof or the like and variation in detection results occurs as illustrated in FIG. 5 in some cases. Accordingly, in the detection bus voltage calibration control, the detected voltage values are compared, and a calibration value is set to the highest detected voltage value. The setting of the calibration value is performed by the calibration value setting portion 33 included in the bidirectional DC-DC converter 30 as described above.

For example, in a "case 1" illustrated in FIG. 5, the voltage detected by the PV converter 22 is 378 V, the voltage detected by the bidirectional DC-DC converter 30 is 380 V, and the voltage detected by the inverter 40 is 385 V. In this case, the calibration value setting portion 33 sets the calibration value to the highest voltage 385 V detected by the inverter 40. The calibration value setting portion 33 outputs the set calibration value to the PV converter 22 and the inverter 40.

The PV converter 22, the bidirectional DC-DC converter 30, and the inverter 40 each calibrate the detected voltages of the HVDC bus 10 to the calibration value (385 V). Then, the PV converter 22, the bidirectional DC-DC converter 30, and the inverter 40 each carry out switching control such that the output voltages approach the target value using the voltage after the calibration.

For example, in the PV converter 22, the detected voltage, which is 378 V, is calibrated to the calibration value 385 V. Then, the PV converter 22 carries out switching control on the basis of the voltage value after the calibration, such that the voltage of the target value is outputted. In the bidirectional DC-DC converter 30, the detected voltage, which is 380 V, is calibrated to the calibration value 385 V. Then, the bidirectional DC-DC converter 30 carries out switching control on the basis of the voltage value after the calibration, such that the voltage of the target value is outputted.

As described above, by adjusting the voltages each detected by the PV converter 22, the bidirectional DC-DC converter 30 and the inverter 40 to the calibration value, the voltages of the HVDC bus 10 are adjusted to a constant value. Additionally, by setting the calibration value of the voltage to the highest voltage among the detection voltages, the voltage of the HVDC bus 10 after the calibration has a tendency to be lower than that before the calibration.

In a case where the control is performed such that the voltage of the HVDC bus 10 is 380 V, by calibrating the voltages of the HVDC bus 10 each detected by the PV converter 22, the bidirectional DC-DC converter 30 and the inverter 40 to 385 V, the voltage of the HVDC bus 10 is controlled to be approximately 375 V ($\approx 380 \times 380/385$).

It is noted that in a "case 2" illustrated in FIG. 5, the calibration value setting portion 33 sets the calibration value to 380 V. In this case, the voltage of the HVDC bus 10 is controlled to be 380 V (=380×380/380). Additionally, in a "case 3", the calibration value setting portion 33 sets the calibration value to 387 V. In this case, the voltage of the HVDC bus 10 is controlled to be approximately 373 V (≈380×380/387).

In a case where this detection bus voltage calibration control is designed so as to adjust the detection voltages to the lowest voltage value thereamong, the voltage of the HVDC bus 10 after the calibration inclines to be controlled toward a higher voltage. In this case, the high voltage is applied to each component of the PV converter 22 or the like. By the high voltage being applied for a long period of time, a lifespan or the like of each component is reduced. However, as in the present embodiment, setting the calibration value to the highest voltage value among the detection voltages and controlling the voltage of the HVDC bus 10 by the value after the calibration make it possible to tendency to lower the voltage applied to each component of the PV converter 22 or the like. Accordingly, reliability of each component can be improved.

Hereinafter, operations executed by each of the PV converter 22, the bidirectional DC-DC converter 30, and the inverter 40 will be described.

Figure 6:
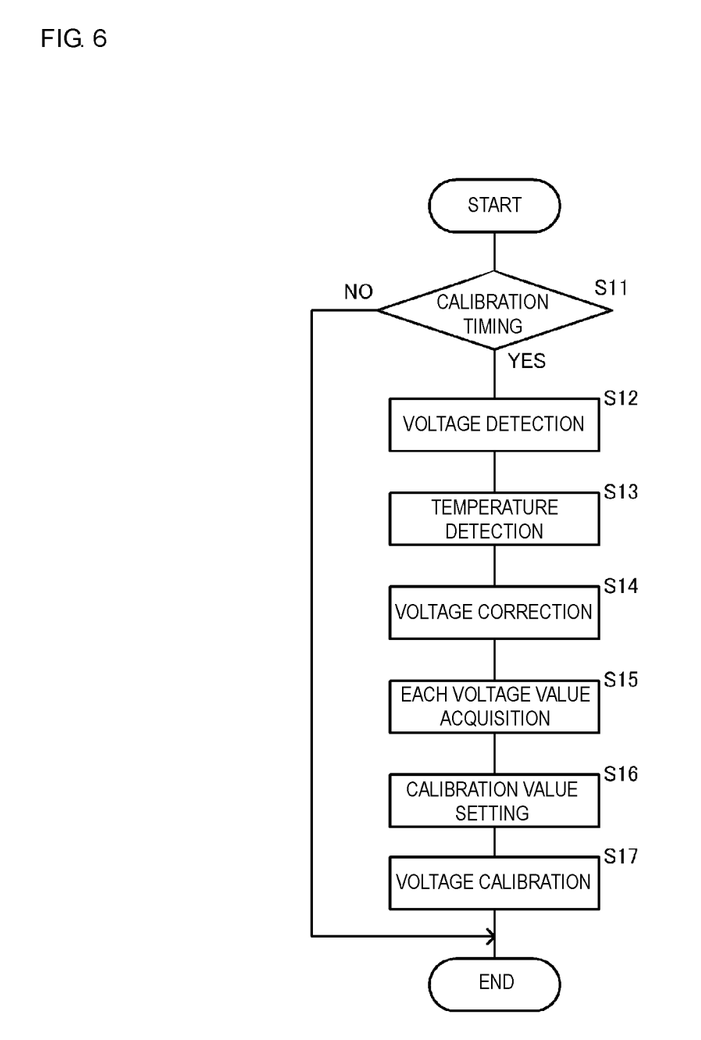
FIG. 6 is a flowchart illustrating operations of the bidirectional DC-DC converter.

FIG. 6 is a flowchart illustrating operations of the bidirectional DC-DC converter 30.

The bidirectional DC-DC converter 30 determines whether or not to perform a calibration timing (S11). The calibration timing is an execution timing of the detection bus voltage calibration control set by the timing setting portion 51 of the controller 50. When the bidirectional DC-DC converter 30 is to not perform the calibration timing (S11: NO), the present processing ends.

Alternatively, if the bidirectional DC-DC converter 30 is to perform the calibration timing (S11: YES), the voltage detection portion 31 detects a voltage (S12). Next, the temperature compensation portion 32 detects temperature (S13), and corrects the voltage detected by the voltage detection portion 31 using temperature characteristics (S14).

The calibration value setting portion 33 acquires the voltage detected by the voltage detection portion 31, and the voltages detected by the PV converter 22 and the inverter 40 (S15). Subsequently, the calibration value setting portion 33 sets a calibration value to the highest voltage value among these voltages (S16). The voltage calibration portion 34 calibrates the voltage detected by the voltage detection portion 31 in S12 to the set calibration value (S17). Thereafter, the controller 36 carries out switching control on the converter portion 35 using the voltage after the calibration such that the voltage of the target value is outputted.

Figure 7:
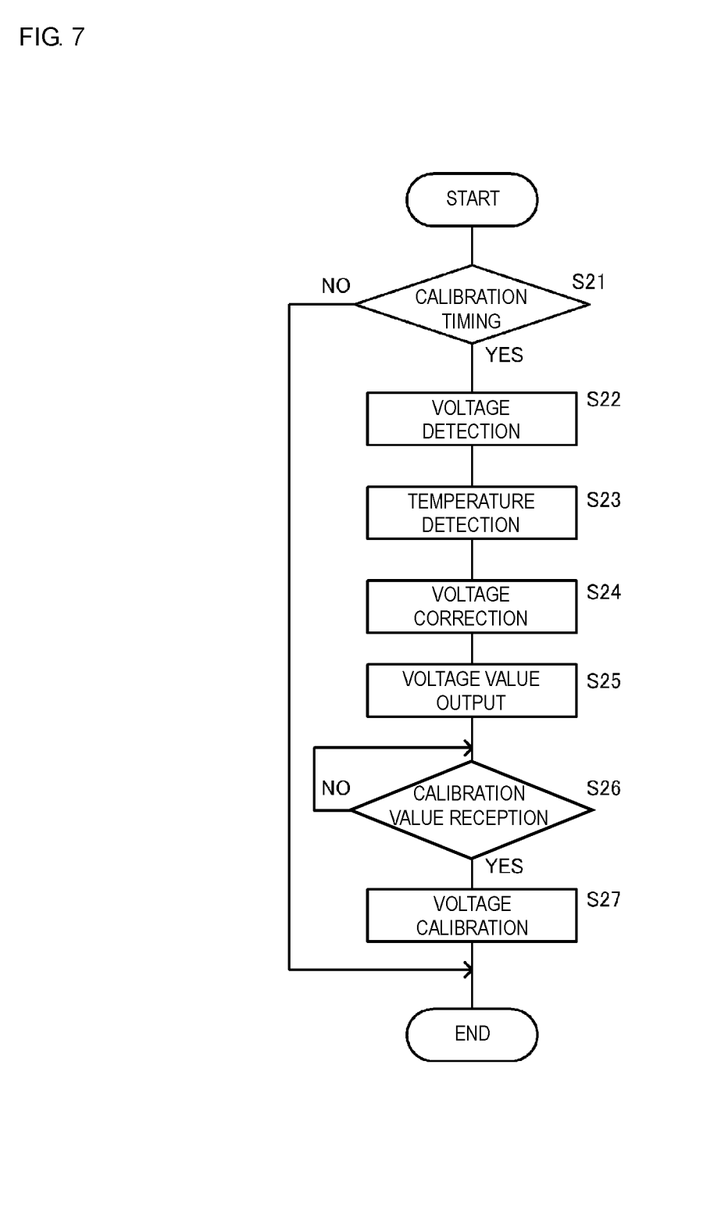
FIG. 7 is a flowchart illustrating operations of the PV converter and the inverter.

FIG. 7 is a flowchart illustrating operations of the PV converter 22 and the inverter 40. The PV converter 22 and the inverter 40 have the same operations, and therefore the operations of the PV converter 22 will be described below.

The PV converter 22 first determines whether or not to perform the calibration timing set by the timing setting portion 51 of the controller 50 (S21). When the calibration timing is not to be performed (S21: NO), the present processing ends. However, when the calibration timing is to be performed (S21: YES), the voltage detection portion 221 of the PV converter 22 detects a voltage (S22). Next, the temperature compensation portion 222 detects temperature (S23), and corrects the voltage detected by the voltage detection portion 221 based on the temperature characteristics (S24).

The voltage value output portion 223 outputs the voltage detected by the voltage detection portion 221 to the bidirectional DC-DC converter 30 (S25). Subsequently, the voltage calibration portion 224 determines whether or not the calibration value set by the bidirectional DC-DC converter 30 is received (S26). When it is not received (S26: NO), the voltage calibration portion 224 stands by until the reception of the calibration value.

When the calibration value is received from the bidirectional DC-DC converter 30 (S26: YES), the voltage calibration portion 224 calibrates the voltage detected by the voltage detection portion 221 in S22 to the set calibration value (S27). Thereafter, the controller 226 carries out switching control on the converter portion 225 using the voltage after the calibration such that the voltage of the target value is outputted.

It is noted that although the present exemplary embodiment is configured such that the bidirectional DC-DC converter 30 sets the calibration value, the calibration value may be set by any of the PV converter 22, the inverter 40, and the controller 50.

Additionally, although, in the present embodiment, the power generation apparatus 20, the bidirectional DC-DC converter 30, and the inverter 40 each detect the temperature in order to detect more accurate temperature, one member of the energy management system 1 may detect the temperature, and the power generation apparatus 20 or the like may perform a voltage correction using the detection result.

REFERENCE SIGNS LIST

B1 SECONDARY BATTERY
R21, R22 VOLTAGE DIVIDING RESISTANCE
R31, R32 VOLTAGE DIVIDING RESISTANCE
R41, R42 VOLTAGE DIVIDING RESISTANCE
S1, S2 SWITCH
1 ENERGY MANAGEMENT SYSTEM
10 HVDC BUS
20 POWER GENERATION APPARATUS
21 OPTICAL POWER GENERATION PANEL
22 PV CONVERTER
30 DC-DC CONVERTER
31 VOLTAGE DETECTION PORTION
32 TEMPERATURE COMPENSATION PORTION
33 CALIBRATION VALUE SETTING PORTION
34 VOLTAGE CALIBRATION PORTION
35 CONVERTER PORTION
36 CONTROLLER
40 INVERTER
41 VOLTAGE DETECTION PORTION
42 TEMPERATURE COMPENSATION PORTION
43 VOLTAGE VALUE OUTPUT PORTION
44 VOLTAGE CALIBRATION PORTION
45 INVERTER PORTION
46 CONTROLLER
50 CONTROLLER
51 TIMING SETTING PORTION
101 ELECTRIC POWER SYSTEM
102 DISTRIBUTION BOARD
221 VOLTAGE DETECTION PORTION
222 TEMPERATURE COMPENSATION PORTION
223 VOLTAGE VALUE OUTPUT PORTION
224 VOLTAGE CALIBRATION PORTION
225 CONVERTER PORTION
226 CONTROLLER

The invention claimed is:

1. An energy management system comprising:
a DC voltage bus;
a power generator connected to the DC voltage bus and configured to output a generated electric power to the DC voltage bus;

a bidirectional DC-DC converter connected to the DC voltage bus and configured to receive a DC voltage from the DC voltage bus or output a DC voltage to the DC voltage bus; and an inverter connected to the DC voltage bus and configured to convert the DC voltage received from the DC voltage bus to an AC voltage, wherein each of the power generator, the bidirectional DC-DC converter, and the inverter includes a voltage detector configured to detect a voltage of the DC voltage bus and a switching controller configured to perform switching control such that the voltage detected by the respective voltage detector matches a target value, wherein the energy management system further comprises:

a calibration value selector configured to compare the voltages detected by the respective voltage detectors and to set a calibration value to a highest voltage of the detection voltages; and a calibrator configured to calibrate the detection voltages of the voltage detectors with the set calibration value.

2. The energy management system according to claim 1, wherein the calibrator excludes calibration of the voltage detector that detected the highest voltage.

3. The energy management system according to claim 1, further comprising a controller area network, with each of the power generator, the bidirectional DC-DC converter, and the inverter being connected to the controller area network for communication thereon.

4. The energy management system according to claim 1, further comprising a controller configured to set a timing when voltage fluctuations of the DC voltage bus are minimized in a predetermined period.

5. The energy management system according to claim 4, wherein the calibrator calibrates at the timing set by the controller.

6. The energy management system according to claim 5, wherein the voltage fluctuations of the DC voltage bus are minimized when the voltage fluctuations are within ±10 volts over the predetermined period.

7. The energy management system according to claim 1, further comprising:

a temperature sensor configured to detect an ambient temperature; and a temperature corrector configured to correct the detection voltage by the respective voltage detectors based on the temperature detected by the temperature sensor.

8. The energy management system according to claim 7, wherein each of the power generator, the bidirectional DC-DC converter, and the inverter includes a temperature compensator that includes the temperature sensor configured to detect the ambient temperature of the power generator, the bidirectional DC-DC converter, and the inverter, respectively.

9. The energy management system according to claim 8, wherein each respective temperature compensator is configured to adjust the detection voltage detected by the voltage detector based on the detected ambient temperature, respectively.

10. The energy management system according to claim 1, wherein the power generator includes an optical power generation panel and a photovoltaic converter configured to output the generated electric power to the DC voltage bus.

11. An energy management system comprising:

a power generator configured to generate and output electric power to a DC voltage bus;

a bidirectional DC-DC converter configured to receive a DC voltage from the DC voltage bus or output a DC voltage to the DC voltage bus;

an inverter configured to receive the DC voltage from the DC voltage bus and convert the DC voltage to an AC voltage;

a calibration value selector configured to compare voltages detected by respective voltage detectors of each of the power generator, the bidirectional DC-DC converter, and the inverter, and to select a highest detected voltage as a calibration value; and a calibration unit configured to calibrate the detected voltages of the respective voltage detectors based on the set calibration value.

12. The energy management system according to claim 11, wherein each of the power generator, the bidirectional DC-DC converter, and the inverter further includes a switching controller configured to perform switching control of the power generator, the bidirectional DC-DC converter, and the inverter, respectively, such that the voltage detected by the respective voltage detectors matches a target value.

13. The energy management system according to claim 12, wherein the calibration unit excludes calibration of the respective voltage detector that detected the highest voltage.

14. The energy management system according to claim 11, wherein each of the power generator, the bidirectional DC-DC converter, and the inverter includes a temperature compensator that includes a temperature sensor configured to detect a respective ambient temperature of the power generator, the bidirectional DC-DC converter, and the inverter.

15. The energy management system according to claim 14, wherein each respective temperature compensator is configured to adjust the detected voltage detected by the respective voltage detector based on the detected ambient temperature, respectively.

16. An energy management method comprising:

generating and outputting, by a power generator, electric power to a DC voltage bus;

converting, by a bidirectional DC-DC converter, a DC voltage received from the DC voltage bus by stepping up or stepping down the received DC voltage;

converting, by an inverter, the DC voltage received from the DC voltage bus to an AC voltage;

comparing voltages detected by respective voltage detectors of each of the power generator, the bidirectional DC-DC converter, and the inverter;

selecting a highest detected voltage as a calibration value based on the compared detected voltages; and calibrating the detected voltages of the respective voltage detectors based on the set calibration value.

17. The energy management method according to claim 16, further comprising performing switching control of the power generator, the bidirectional DC-DC converter, and the inverter, respectively, such that the voltage detected by the respective voltage detectors matches a target value.

18. The energy management system according to claim 17, further comprising excluding calibration of the respective voltage detector that detected the highest voltage.

19. The energy management system according to claim 16, further comprising detecting, by a temperature compensator of each of the power generator, the bidirectional DC-DC converter, and the inverter, a respective ambient temperature of the power generator, the bidirectional DC-DC converter, and the inverter.

20. The energy management system according to claim 19, further comprising adjusting, by each respective temperature compensator, the detected voltage detected by the respective voltage detector based on the detected ambient temperature, respectively.

* * * * *